United States Patent [19]

Chang

[11] Patent Number: 5,033,222
[45] Date of Patent: Jul. 23, 1991

[54] INSTANT BAIT PULL DEVICE

[76] Inventor: Jang-Huey Chang, 14, Lane 90, Chung Hsiao Rd., Lotung, Ilan, Taiwan

[21] Appl. No.: 531,366

[22] Filed: May 31, 1990

[30] Foreign Application Priority Data

Apr. 18, 1990 [CN] China ................ 79204033

[51] Int. Cl.⁵ ............................................. A01K 97/00
[52] U.S. Cl. ........................................................ 43/16
[58] Field of Search ............................... 43/15, 16, 17

[56] References Cited

U.S. PATENT DOCUMENTS

| | | | |
|---|---|---|---|
| 834,414 | 10/1906 | Schmidt | 43/16 |
| 1,665,144 | 4/1928 | Murray | 43/15 |
| 1,996,704 | 4/1935 | Hawkinson | 43/16 |
| 2,797,516 | 7/1957 | Suddarth | 43/15 |
| 3,660,922 | 5/1972 | Chill | 43/15 |
| 3,702,512 | 11/1972 | Hodshire | 43/15 |
| 3,823,501 | 7/1974 | Bybee | 43/15 |
| 4,124,948 | 11/1978 | Mautner | 43/15 |

Primary Examiner—Kurt Rowan
Assistant Examiner—James Miner
Attorney, Agent, or Firm—Browdy and Neimark

[57] ABSTRACT

An instant bait pull device includes a body in the shape of a strip. There is a floating ball on the end to be connected to the fishing rod with a line, and the tail end includes two symmetrical hooks to be extended from a separating shelf. There is an elastic belt control inside the body able to actuate the device to cause the hook to pull instantly and make the body of the fish be hooked in on the moment the hook is bitten by the fish. In the meantime the floating ball will be released from the former end and will go up along the line and float on the surface of the water in order that the user will take notice of the hooking in of the fish. It is a practical instant bait pull device to be used in fishing.

4 Claims, 4 Drawing Sheets 5,033,222

INSTANT BAIT PULL DEVICE

BACKGROUND OF THE INVENTION

This invention relates to automatic fish hook setting devices.

In the sport of fishing, it is well known that the fish is often able to snatch bait from the fisherman's hook before the fisherman reacts to the fish's presence; in some cases, the fish makes off with the bait. In other cases, the fisherman may be entirely unaware of the fish, as, for example, when the fisherman has set down his pole or when he is inattentive.

Accordingly, it is a primary object of the present invention to provide a fish hook setting device which is sensitive and discharges easily when a fish takes the hook in his mouth.

Another object of the invention is to provide a fish setting device which, while sensitive to the fish does not tend to trigger accidentally.

Still another object the invention is to provide a signal to the fisherman when the hook setting device has discharged.

SUMMARY OF THE INVENTION

The main purpose of the present invention is to provide a fishing device without a float or sinker, designed to facilitate catching fishes which are eating the bait by means of an instant bait pull device. The device operates no matter what is the size, species, whenever a fish eats the bait or pulls the fishing hook. It will be hooked in accurately. This is obviously an improvement and progress.

The other purpose of the present invention is to provide a novel instant bait pull device, it has a safety unit and a display unit to prevent the actuation to be incurred by the swing of the fishing line or the failure of the bait pull device and display automatically to bring the effect of the device into full play and attain the above objective.

The size of the instant bait pull device is small, the structure is simple and the installation, control and use are convenient. Both well experienced old hands and new hands are able to get high fish catches by means of this device which will increase their interest in fishing.

DETAILED DESCRIPTION OF THE PREFERRED EMBODIMENT

The instant bait pull device of the present invention as shown in the figures attached hereafter includes a strip shape body 11. There is an instant actuator inside the hollow body, and a float ball 12 on the upper end of body 11. It is connected to the fishing rod by means of the fishing line (the fishing rod is not shown in the figure). Two symmetrical fishing hook sets 15, 16 are extended out of the separating shelf 14 on the lower end of the body 11.

Figure 3:
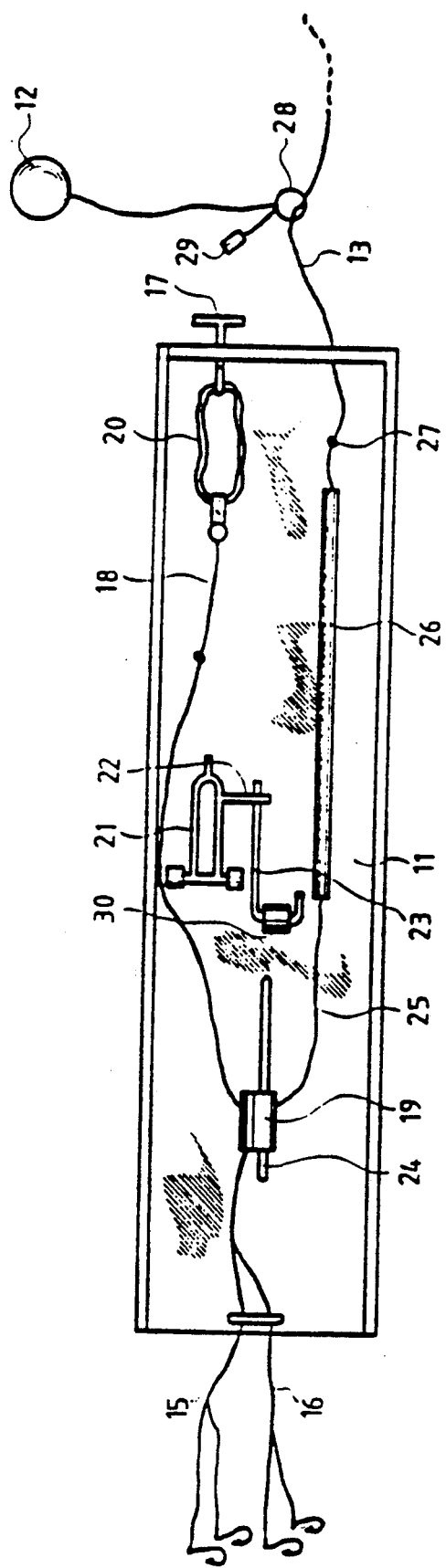
FIG. 3 is a bird's view of the present invention to show the device in the state having not been actuated yet.
Figure 4:
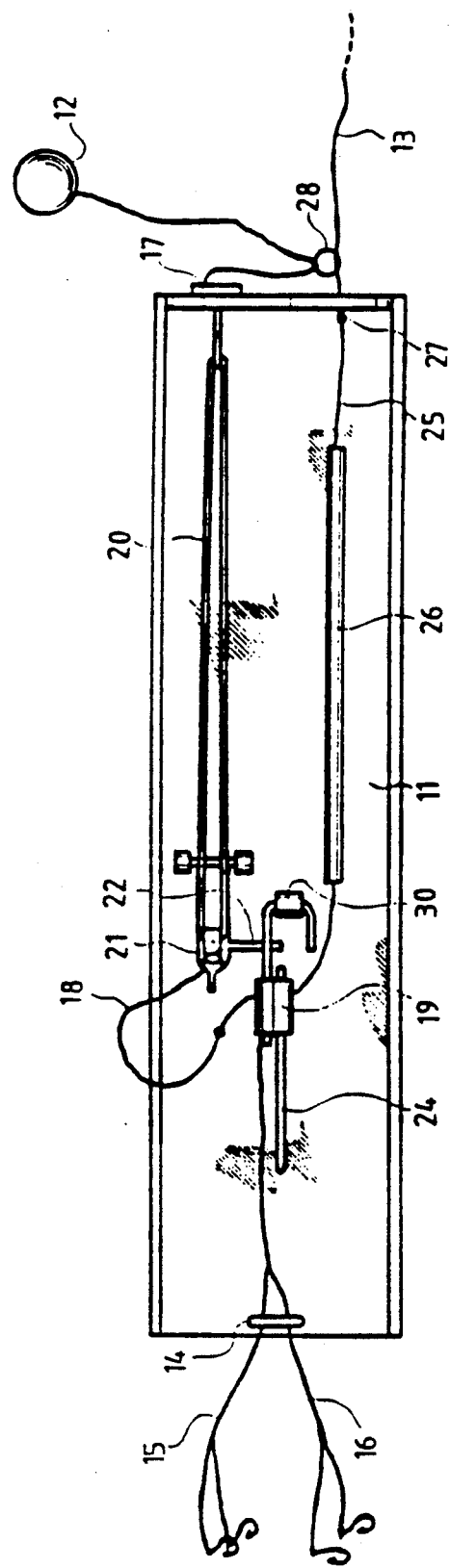
FIG. 4 is a bird's view to show the device having already been actuated.

The body 11 is roughly in strip shape, the instant actuator installed in the hollow interior of the body is shown in FIGS. 3 and 4. The instant actuator includes an elastic belt 20. Its upper end is connected to the upper end of the body 11 by means of a pressing plate 17. The lower end is connected to the fishing hook sets 15, 16 via an encasing stand 19 by pull line 18. A movable buckle 21 is pivoted on the surface of body 11 below the elastic belt 20. The pointed end of the movable buckle 21 may be used for hooking the elastic belt and cause the elastic belt to be extended (as shown in FIG. 3). One side of the movable pressing rod 23 is pivoted below the movable buckle 21 on the surface of the body at the side having lateral pressing rod 22. A slide shaft 24 is fixed on the surface of the body below the movable pressing rod 23. An encasing stand 19 connected with the fishing hook sets 15, 16 is encased on the sliding shaft and the encasing stand is able to slide freely along the sliding shaft 24.

Another pull line 25 on the encasing stand 19 penetrates through the fixed harness 26 on the surface of the body, and then penetrates the surface of the upper end of the body 11 to connect to the fishing line 13 with the check knot 27 to form a safety device. While the fishing rod is swinging, the weight of the body 11 is supported and checked at the upper end of the body by means of the check knot 27 and the encasing stand 19 is pulled up and fixed up by the specific length of pull line 25 between knot 27 and stand 19 without slipping off. When swinging the fishing rod, it ensures that the safety device on the body won't be actuated mistakenly.

The fishing hook sets 15, 16 penetrate the separating shelf 14 on the surface of the body respectfully and connect the encasing stand 19 in common. In rapid current, they drift to become two symmetrical separate fishing hook sets 15, 16 and form a uniform pull force of the fishing hook sets 15, 16 by means of the separating shelf 14. Owing to the blocking of the separating shelf 14, the pull force will not cause the moving of the encasing stand 19 to prevent erroneous actuating of the actuator to be incurred by the rapid current (but the device will be actuated accurately once the bait is eaten by a fish on account of it is hardly possible that the two sets of fishing hook are eaten by two fishes in same size with same pull force simultaneously).

The float ball 12 includes an encasing ring 28 to be connected by the pull line and encased on fishing line 13. Encasing ring 28 is also connected to a pressing plate 29 with pull line, and the pressing plate 29 will be pressed on the body by the pressing board 17 on the upper end of the body to form a display unit while the elastic belt 12 is extended. Once the bait pulling device on the body moves, the loosening of the elastic belt 20 results in the release and departing of the pressing plate 29 by the pressing board 17, the float ball 12 will be able to float out of the surface of water along the fishing line 13 in order to inform the fisherman that there is a fish on the fishing hook or the bait pull device has become ineffective.

Figure 1:
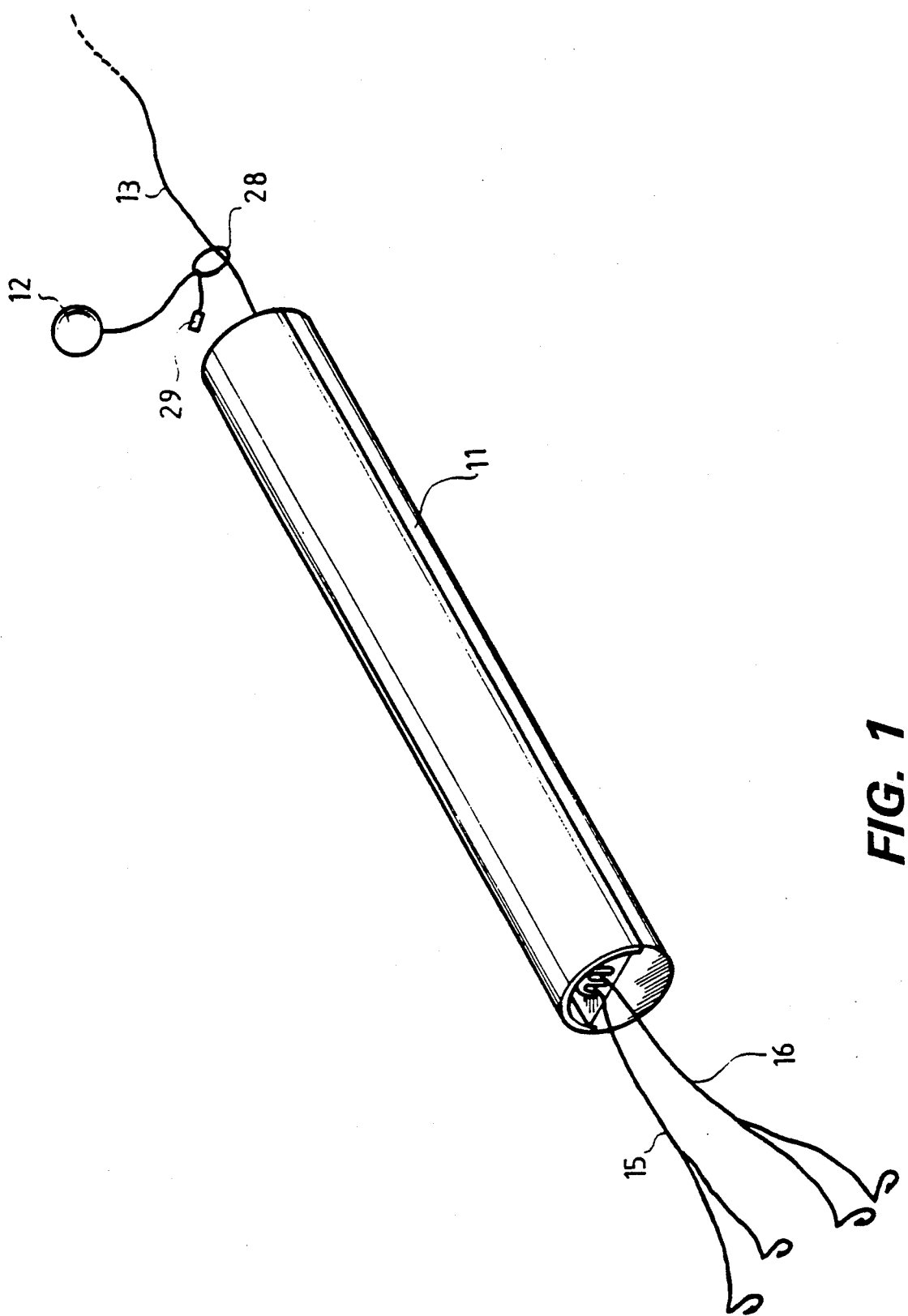
FIG. 1 is the solid external view of the present invention.
Figure 2:
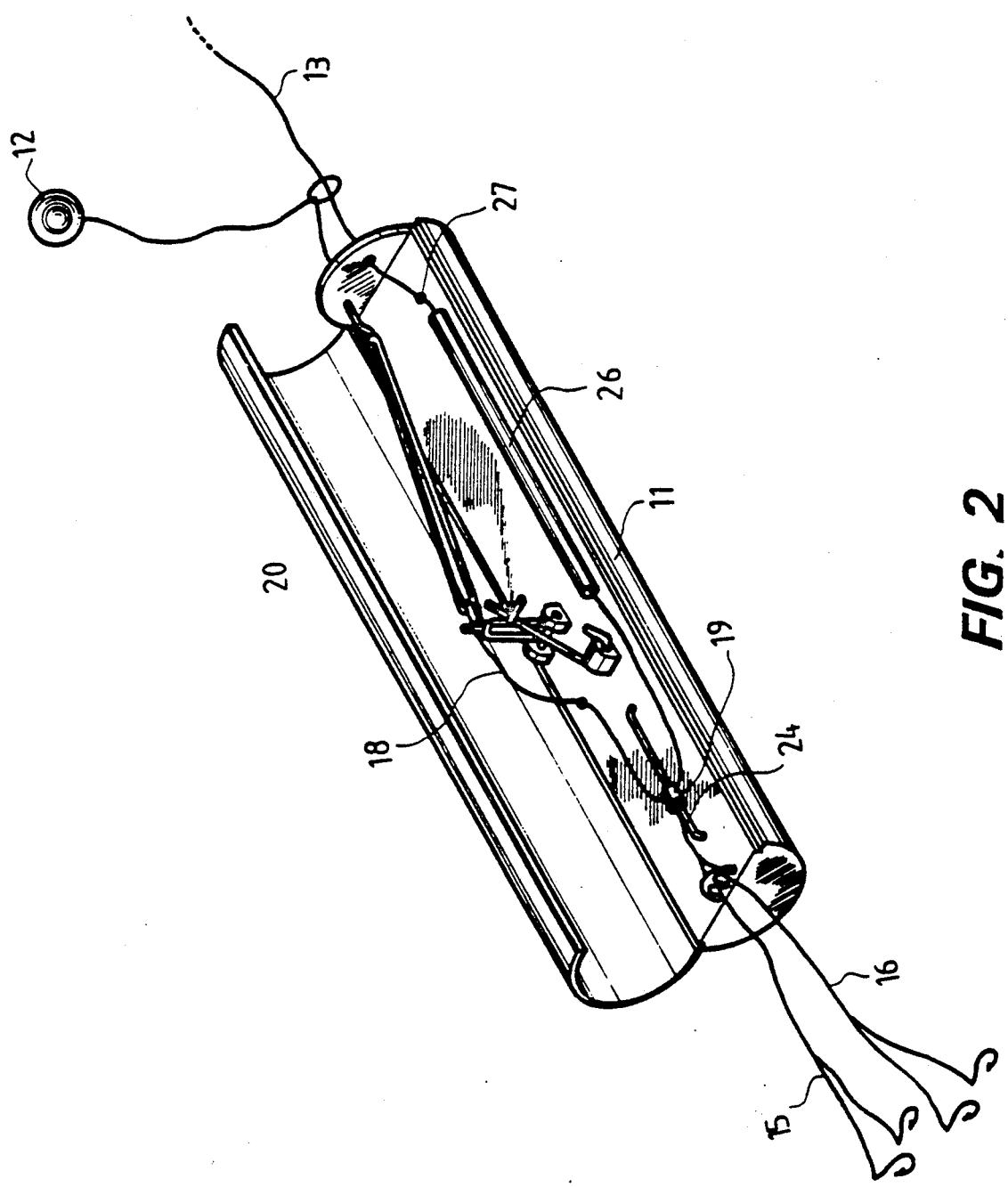
FIG. 2 shows to open the upper cover of the present invention to display the internal components.

The setting of the instant bait pull device on body 11 is shown in FIGS. 2, 3 and 4. It is to turn the movable buckle 21 downward against the surface of the body, turn the movable pressing rod downward against the surface of the body, and press the lateral pressing rod 22 of the movable buckle 21 simultaneously, at this time the movable pressing rod 23 is positioned at the side of sliding shaft 24 closely against the sliding shaft 24. Next move the encasing stand 19 upward to encase the movable pressing rod 23, and then pull the lower end of the elastic belt 20 to the position of the movable buckle 21 to buckle it up on the pointed end at the upper end of the movable buckle 21 and complete the setting.

The completed device will be able to perform the action of swing smoothly with the control of specific pull line 25 of the encasing stand and it is able to prevent erroneous touching of the actuator. The elastic belt 20 will remain in the state of extension due to the pressing of the movable buckle 21 by the encasing stand 19 and the movable pressing rod 23, and the float ball pressing plate 29 is pressed tightly on the upper end of the body by pressing board 17.

While the fishing hook set 15 and 16 is pulled by the biting of bait of the fish, the encasing stand 19 is pulled to slide downward and cause the movable pressing rod 23 to depart from encasing stand 19. In the meantime the movable pressing rod 23 will not press the lateral pressing rod 22 of the movable buckle 21 and the movable buckle 21 will release the elastic belt 20 instantly. The retracted elastic belt 20 will bring the specific length pull line 18 to move immediately, and the fishing hook sets 15, 16 on the end of the pull line will hook in the fishes which are biting baits tightly and not release them due to the instant elastic force.

After the loosening of the elastic belt 20, the float ball 12 will float up to the surface of the water along the fishing line as stated above to inform the fisherman that the actuator has completed the instant action of setting the hook. It is now necessary to reset the actuator anew.

As stated above, by means of the biting of the fish to actuate the present device and pull the fishing hook sets the hook in the fish via instant elastic force. The feature of the action of the present device is quite different from the conventional method of fishing with a sinker and float. It is practical and more effective and provides a higher catch as well as increased interest. The "Instant Bait Pull Device" is believed to be an innovative creation being both practical and effective.

I claim:

1. A fish hook setting and signal device connected to a fishing rod by a fishing line for automatically hooking nibbling fish on fish hooks connected to said device by fishing lines and after hooking the fish signalling the fisherman, said device comprising, a housing having an inner cavity opening at the lower end of said housing, a separating shelf at said opening of said housing to separate the fishing lines extending through said separating shelf, said fish hooks connected to said fishing lines, instant actuator means engaged to said housing in said cavity for automatically setting the fish hooks connected to said actuator in the mouths of nibbling fish, a float ball slideably engaged to the fishing line connected to the fishing rod, said float ball releasably connected to said actuator means, wherein said instant actuator means releases said float ball when a nibbling fish is hooked.

2. The fish hook setting and signal device of claim 1, wherein said instant actuator means comprises, an elastic belt, one end of said elastic belt connected to a T-bar slideably engaged on an upper end of said housing, a second end of said elastic belt connected to the fishing hooks through an encasing stand slideably engaged in said cavity by a first pull line with a specific length, buckle means pivotally engaged in said cavity for extending said elastic belt toward a lower end of said housing, rod means pivotally engaged in said cavity for maintaining said buckle means in a position where said elastic belt is extended, said encasing stand slideably engaging said rod means when maintaining said buckle means in a position where said elastic belt is extended, wherein the hook is set by the nibbling fish when the encasing stand is slideably disengaged from said rod means and said elastic belt retracts with said first pull line and moves said encasing stand and connected hooks upward.

3. The fish hook setting and signal device of claim 2, wherein said float ball is connected to said T-bar to permit release of said float ball when said encasing stan d is slideably disengaged.

4. The fish hook setting and signal device of claim 1 comprising, a second pull line having a specific length connected to said encasing stand, said second pull line passing through a fixing harness and said upper end of said housing to the fishing line connected to the fishing rod, a knot on said second pull line below said upper end of said housing to bear the weight of the housing and limit the upward movement of said encasing stand when fishing.

* * * * *